(12) United States Patent
Dung et al.

(10) Patent No.: US 7,633,184 B2
(45) Date of Patent: Dec. 15, 2009

(54) FAN AND SWITCH CONTROL DEVICE THEREOF

(75) Inventors: Yu-Lung Dung, Taoyuan Hsien (TW); Yu-Liang Lin, Taoyuan Hsien (TW); Yueh-Lung Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 198 days.

(21) Appl. No.: 11/812,655

(22) Filed: Jun. 20, 2007

(65) Prior Publication Data

US 2008/0012429 A1 Jan. 17, 2008

(30) Foreign Application Priority Data

Jun. 23, 2006 (TW) ............................... 95122719 A

(51) Int. Cl.
*H01H 35/06* (2006.01)
*H02P 1/04* (2006.01)

(52) U.S. Cl. ........................ 307/120; 318/461

(58) Field of Classification Search ............... 307/112, 307/116, 120; 318/471, 447, 449, 461; 361/690, 361/694
See application file for complete search history.

(56) References Cited

U.S. PATENT DOCUMENTS

| | | | |
|---|---|---|---|
| 6,996,333 B1* | 2/2006 | Lin | 318/400.26 |
| 7,023,109 B2* | 4/2006 | Amano | 307/64 |
| 7,075,261 B2* | 7/2006 | Burstein | 318/400.11 |
| 7,290,502 B2* | 11/2007 | Kidd et al. | 122/14.2 |

* cited by examiner

*Primary Examiner*—Albert W Paladini
(74) *Attorney, Agent, or Firm*—Birch, Stewart, Kolasch & Birch, LLP

(57) ABSTRACT

A switch control device receives an input signal and a power signal and includes a control unit and a switch unit. The control unit has a predetermined value and receives the input signal and the power signal. When the input signal is lower than the predetermined value, the control unit outputs a control signal. The switch unit is electrically connected with the control unit, receives the control signal, and stops outputting the power signal according to the control signal.

20 Claims, 8 Drawing Sheets

FAN AND SWITCH CONTROL DEVICE THEREOF

CROSS REFERENCE TO RELATED APPLICATIONS

This Non-provisional application claims priority under 35 U.S.C. §119(a) on Patent Application No. 095122719 filed in Taiwan, Republic of China on Jun. 23, 2006, the entire contents of which are hereby incorporated by reference.

BACKGROUND OF THE INVENTION

1. Field of Invention

The invention relates to a fan and a switch control device thereof, and in particular, to a fan capable of controlling the provision of a power, and a switch control device thereof.

2. Related Art

Requirements on the functions of electronic apparatus are getting higher and higher, and the number of various accessory apparatuses is getting higher and higher. When the electronic apparatus of a system is in a standby state, it stores a small power for the electronic apparatus in order to keep the rapid starting state. Although the system has stopped operating when the electronic apparatus is in the standby state, peripheral elements or circuits of the electronic apparatus, e.g., a fan, receive and consume the power since the small power is still stored in the electronic apparatus. Thus, the quality and the power consumption of the electronic apparatus and the system, such as a notebook computer equipped with a battery, are influenced.

Illustrations will be made by taking the fan of the notebook computer as an example. Referring to FIG. 1, a conventional fan 1 has a drive control device 11, a motor 12 and a plurality of peripheral elements 13 for the fan, and receives a pulse width modulation (PWM) signal $S_{PWM}$ inputted from the outside and a power Vd. The drive control device 11 has a predetermined value D1 for stopping the fan. When the notebook computer in on standby, the pulse width modulation signal $S_{PWM}$ is lower than the predetermined value D1, and the drive control device 11 stops the motor 12.

Although the motor 12 has stopped operating, the peripheral elements 13 still keep consuming the working power because the small power is still fed into the fan 1. If the notebook computer is powered by a battery, the peripheral elements 13 use up the power of the battery so that the notebook computer cannot be started or used immediately.

The above-mentioned condition occurs not only in the notebook computer but also in various electronic hand-held apparatuses or products powered by batteries. When the apparatus is on standby or shuts down, the peripheral elements pertaining to the fan still continuously consume the working power. Thus, the power in the battery of the electronic apparatus or product is used up, and the electronic apparatus or product cannot be started or used immediately. It is more serious to the electronic apparatus or product which is aimed on the power consumption because the use is lowered and the power is wasted.

Thus, it is an important subject of the invention to provide a fan capable of controlling the provision of a power and a switch control device thereof, wherein the power supplied to the fan is stopped when the fan stops so that the peripheral elements of the fan cannot continuously consume the working power.

SUMMARY OF THE INVENTION

In view of the foregoing, the invention is to provide a fan capable of controlling the provision of a power and a switch control device thereof, wherein the power supplied to the fan is stopped when the fan rotates at a low speed or even stops so that the peripheral elements of the fan cannot continuously consume the working power.

To achieve the above, the invention discloses a switch control device including a control unit and a switch unit. The switch control device receives an input signal and a power signal. The control unit has a predetermined value and is electrically connected with the switch unit. The control unit receives the input signal and the power signal and outputs a control signal when a value of the input signal is unequal to the predetermined value. The switch unit is electrically connected with the control unit and receives the control to stop outputting the power signal according to the control signal.

To achieve the above, the invention also discloses a fan including a motor, a driving device and a switch control device. The fan receives an input signal and a power signal. The driving device is electrically connected with the motor for receiving the input signal and power signal to drive the motor. The switch control device is electrically connected with the driving device and includes a control unit and a switch unit. The control unit has a predetermined value and is electrically connected with the switch unit. The control unit receives the input signal and the power signal, and outputs a control signal when a value of the input signal is unequal to the predetermined value. The switch unit is electrically connected with the control unit and receives the control signal to stop outputting the power signal according to the control signal, wherein the motor, the driving device, and the switch control device are built in the fan.

As mentioned above, the fan and the switch control device thereof according to the invention directly compare the input signal with the predetermined value, or compare the number of turn-on pulses or that of turn-on cycles of the input signal, which can be counted by a counting element, with the predetermined value. When the value of the input signal is lower than the predetermined value, the above-mentioned method enables the switch control device to judge whether to stop outputting the power signal to the driving device in order to stop driving the motor. Compared with the prior art, the fan of the invention compares the value of the input signal with the predetermined value through the switch control device, and can immediately stop providing the power to the fan when the fan is powered off so as to prevent the fan and its peripheral circuits and elements form consuming the power. In addition, the invention is composed of the circuits with the extremely low power consumption so that the consumed current of the overall circuits in the fan can be effectively lowered and controlled. Thus, the green environmental protection and the power-saving effect can further be achieved.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
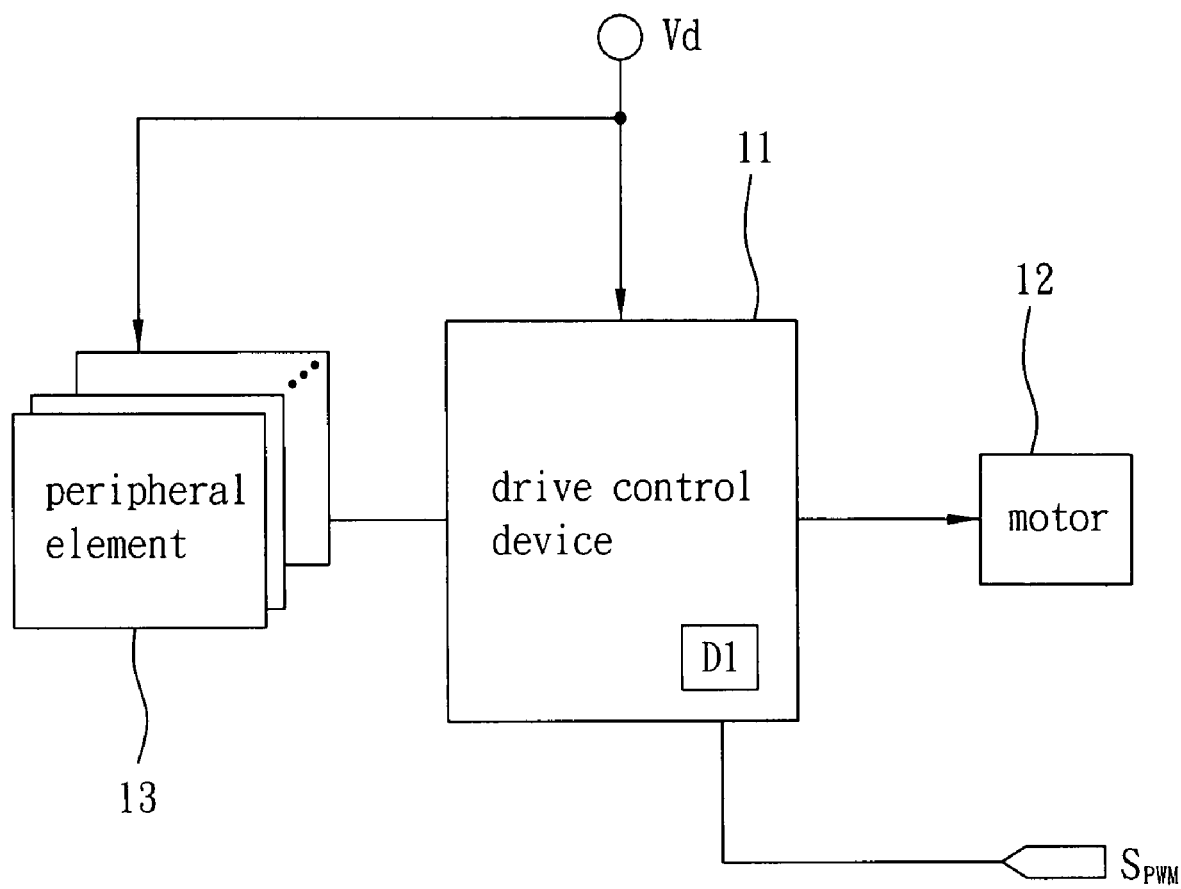
FIG. 1 is a schematic illustration showing a conventional fan.
Figure 2:
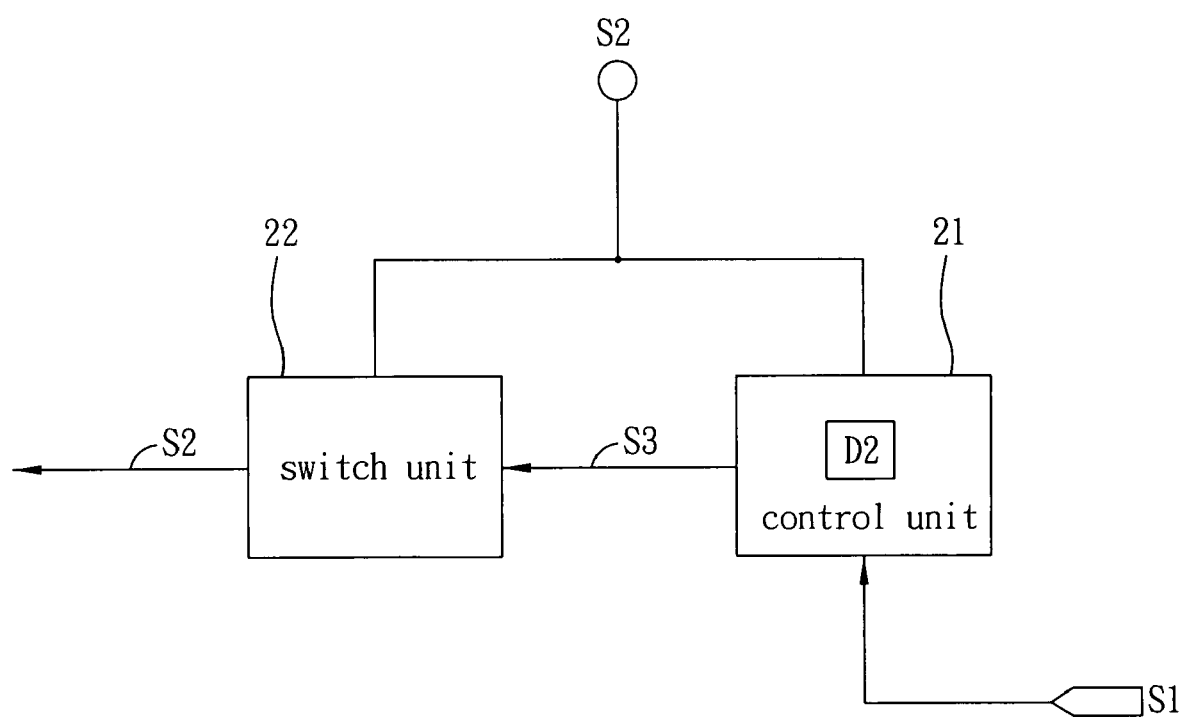
FIG. 2 is a schematic illustration showing a switch control device according to an embodiment of the invention.

As shown in FIG. 2, a switch control device 2 according to the embodiment of the invention receives an external input signal S1 and a power signal S2. The switch control device 2 includes a control unit 21 and a switch unit 22. The input signal S1 in this embodiment is a pulse width modulation (PWM) signal or a count value, and the power signal S2 is a voltage or a current.

Figure 3:
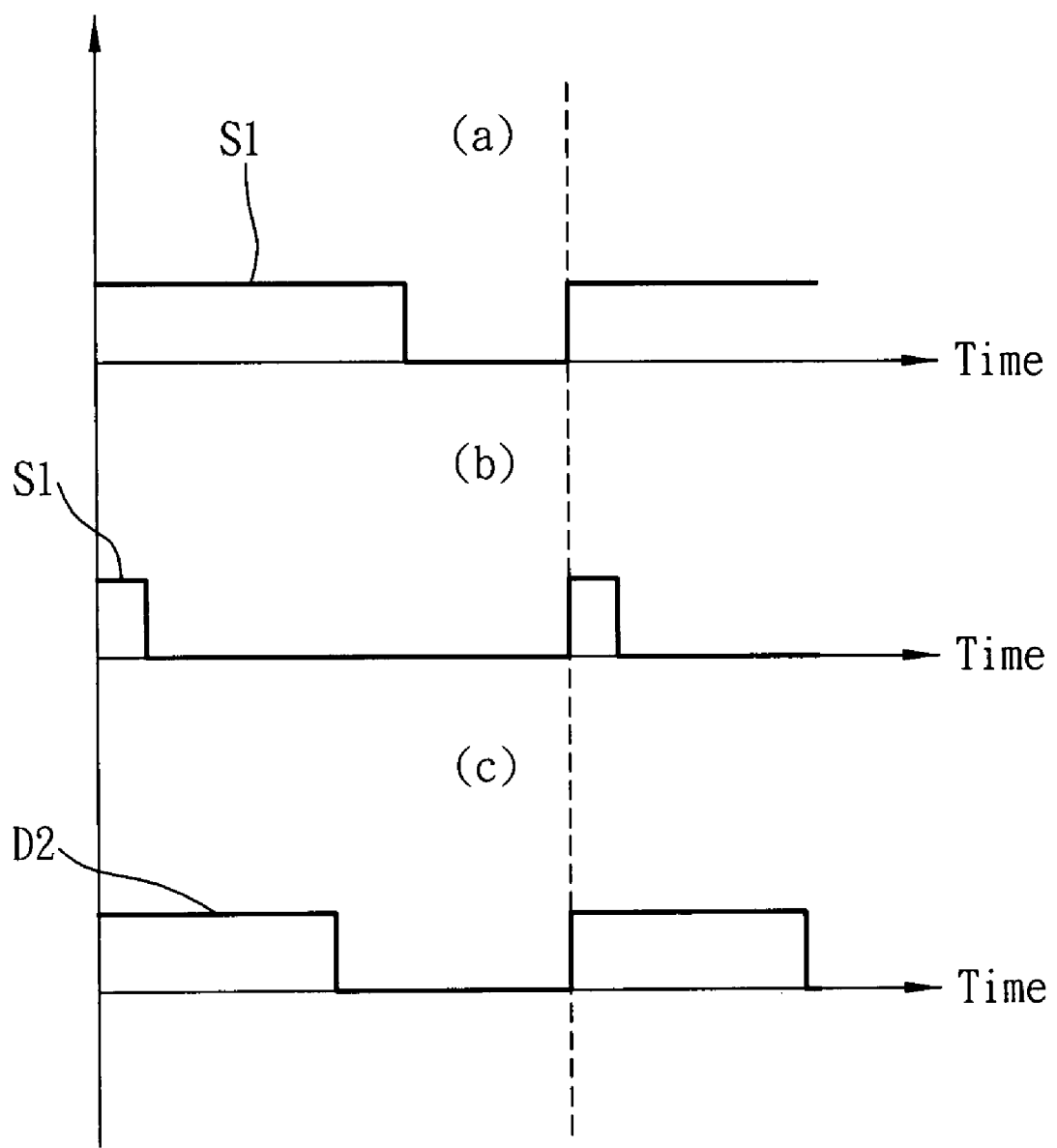
FIG. 3 is a schematic illustration showing an input signal and a predetermined value in the switch control device according to the embodiment of the invention in a duty cycle.

The control unit 21 has a predetermined value D2 and receives the input signal S1 and the power signal S2. Referring to FIGS. 2 and 3, when the value of the input signal S1 is the PWM signal value in this embodiment, the control unit 21 compares the value of the input signal S1 ((a) in FIG. 3) with the predetermined value D2 ((c) in FIG. 3) such as a duty cycle. When the value of the input signal S1 is lower than the predetermined value D2 (compared (b) with (c) in FIG. 3), the control unit 21 outputs a control signal S3. The control unit 21 can be implemented by, without limitation to, a control circuit or a processor.

Figure 4:
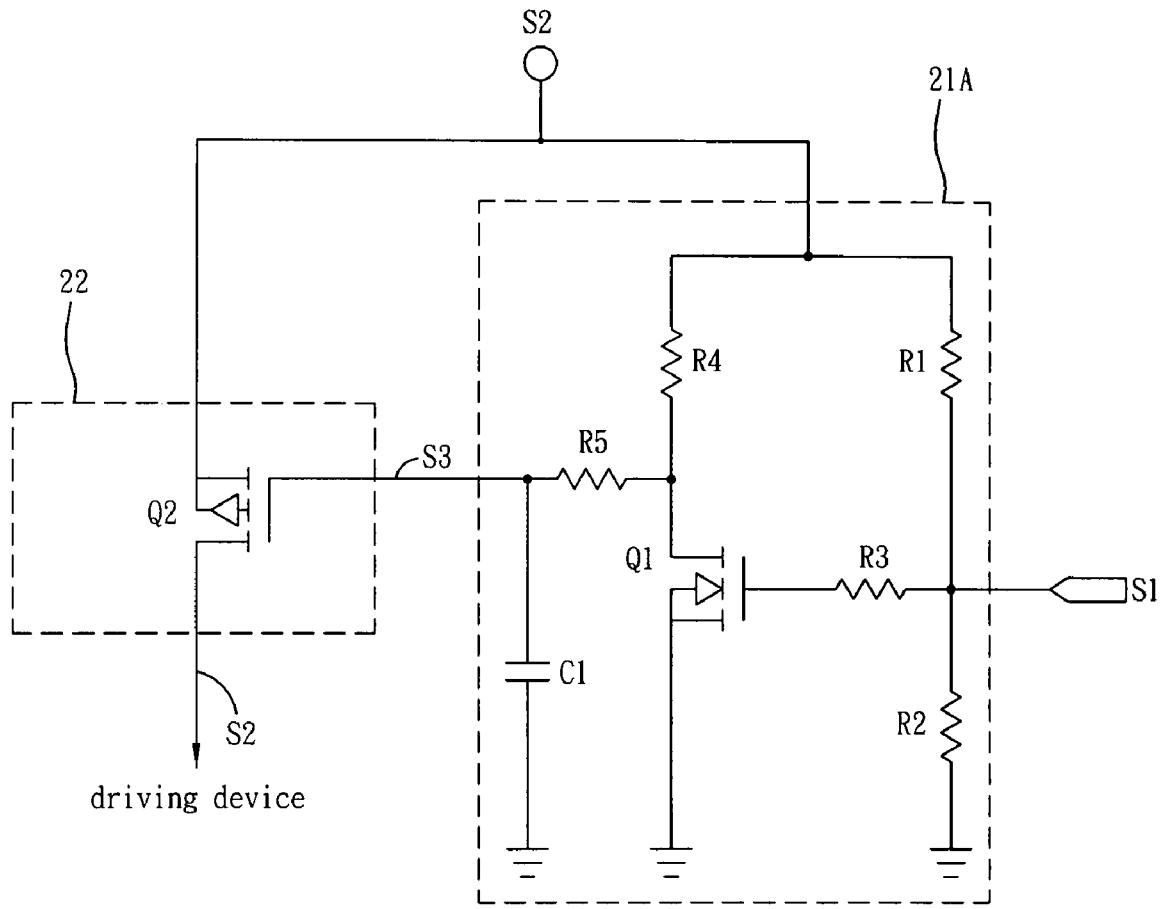
FIG. 4 is a schematic illustration showing the switch control device according to the embodiment of the invention, wherein the control unit is a control circuit.

FIG. 4 shows a switch control device 2A according to the embodiment of the invention. As shown in FIG. 4, when the control unit 21A is a control circuit, the control circuit includes a first resistor R1, a second resistor R2, a third resistor R3, a fourth resistor R4, a first transistor Q1, a fifth resistor R5 and a first capacitor C1. The first resistor R1 has a first terminal for receiving the power signal S2, and a second terminal for receiving the input signal S1. The second resistor R2 has a first terminal electrically connected with the second terminal of the first resistor R1, and a second terminal grounded. The third resistor R3 has a first terminal for receiving the input signal S1. The fourth resistor R4 has a first terminal for receiving the power signal S2 and electrically connected with the first terminal of the first resistor R1. The first transistor Q1 has a gate electrically connected with a second terminal of the third resistor R3, a drain electrically connected with a second terminal of the fourth resistor R4, and a source grounded. The fifth resistor R5 has a first terminal electrically connected with the second terminal of the fourth resistor R4 and the drain of the first transistor Q1. The first capacitor C1 has a first terminal electrically connected with a second terminal of the fifth resistor R5, and a second terminal grounded. In this embodiment, the first resistor R1 and the second resistor R2 have the biasing effect, and the third resistor R3 functions to limit the current. The first transistor Q1 can be implemented by, without limitation to, a NMOS transistor.

Figure 5:
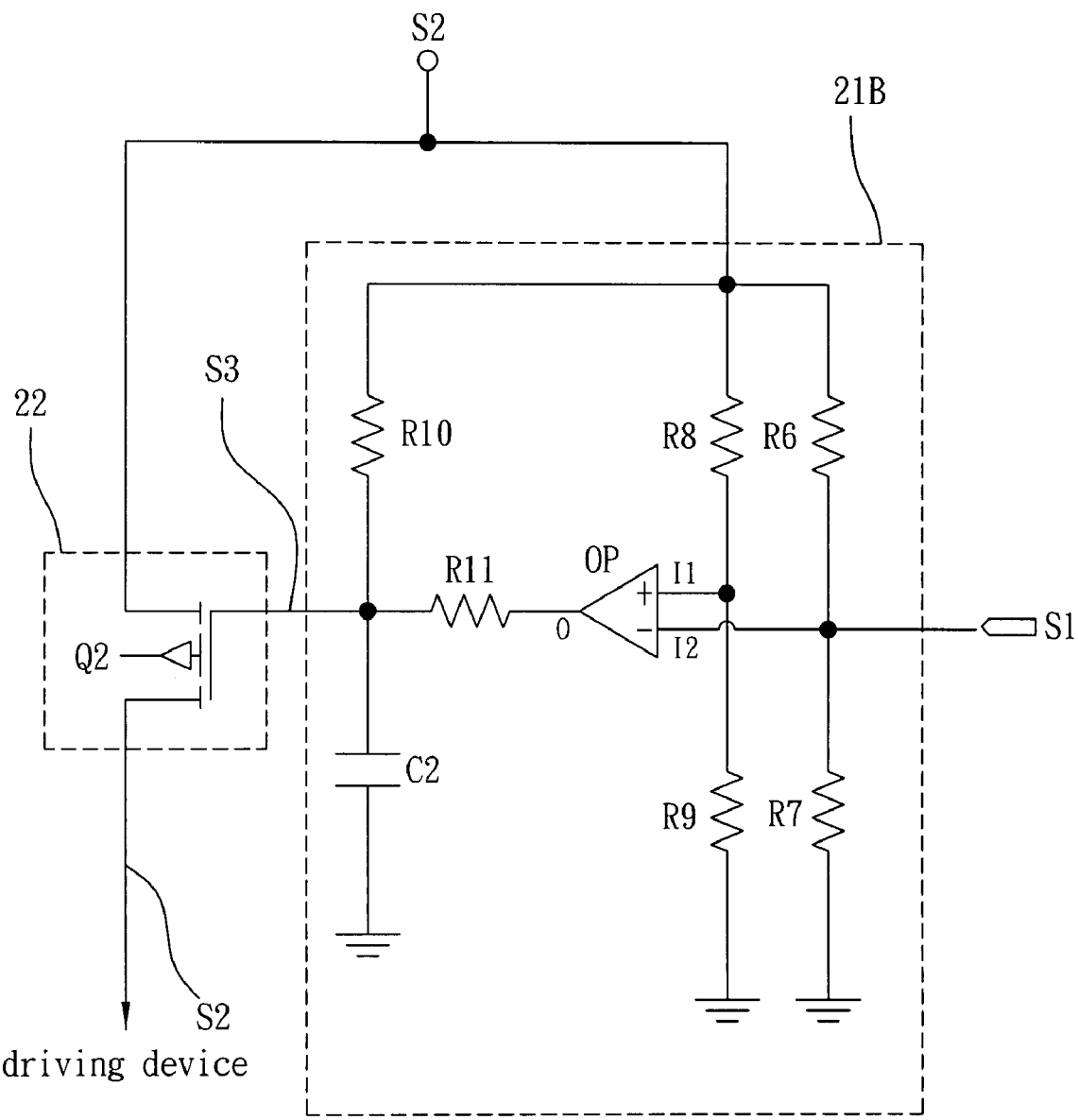
FIG. 5 is a schematic illustration showing the switch control device according to the embodiment of the invention, wherein the control unit is another control circuit.

FIG. 5 shows a switch control device 2B according to the embodiment of the invention. As shown in FIG. 5, in the aspect when the control unit 21B is another control circuit, the control circuit includes a sixth resistor R6, a seventh resistor R7, an eighth resistor R8, a ninth resistor R9, a tenth resistor R10, an eleventh resistor R11, an operational amplifier OP and a second capacitor C2. The sixth resistor R6 has a first terminal for receiving the power signal S2, and a second terminal for receiving the input signal S1. The seventh resistor R7 has a first terminal electrically connected with the second terminal of the sixth resistor R6, and a second terminal grounded. The eighth resistor R8 has a first terminal for receiving the power signal S2. The operational amplifier OP has a first input terminal I1 electrically connected with a second terminal of the eighth resistor R8, and a second input terminal I2 for receiving the input signal S1. The ninth resistor R9 has a first terminal electrically connected with the first input terminal I1 of the operational amplifier OP, and a second terminal grounded. The tenth resistor R10 has a first terminal for receiving the power signal S2. The eleventh resistor R11 has a first terminal electrically connected with an output terminal O of the operational amplifier OP, and a second terminal electrically connected with a second terminal of the tenth resistor R10. The second capacitor C2 has a first terminal electrically connected with the second terminal of the eleventh resistor R11, and a second terminal grounded.

Figure 6:
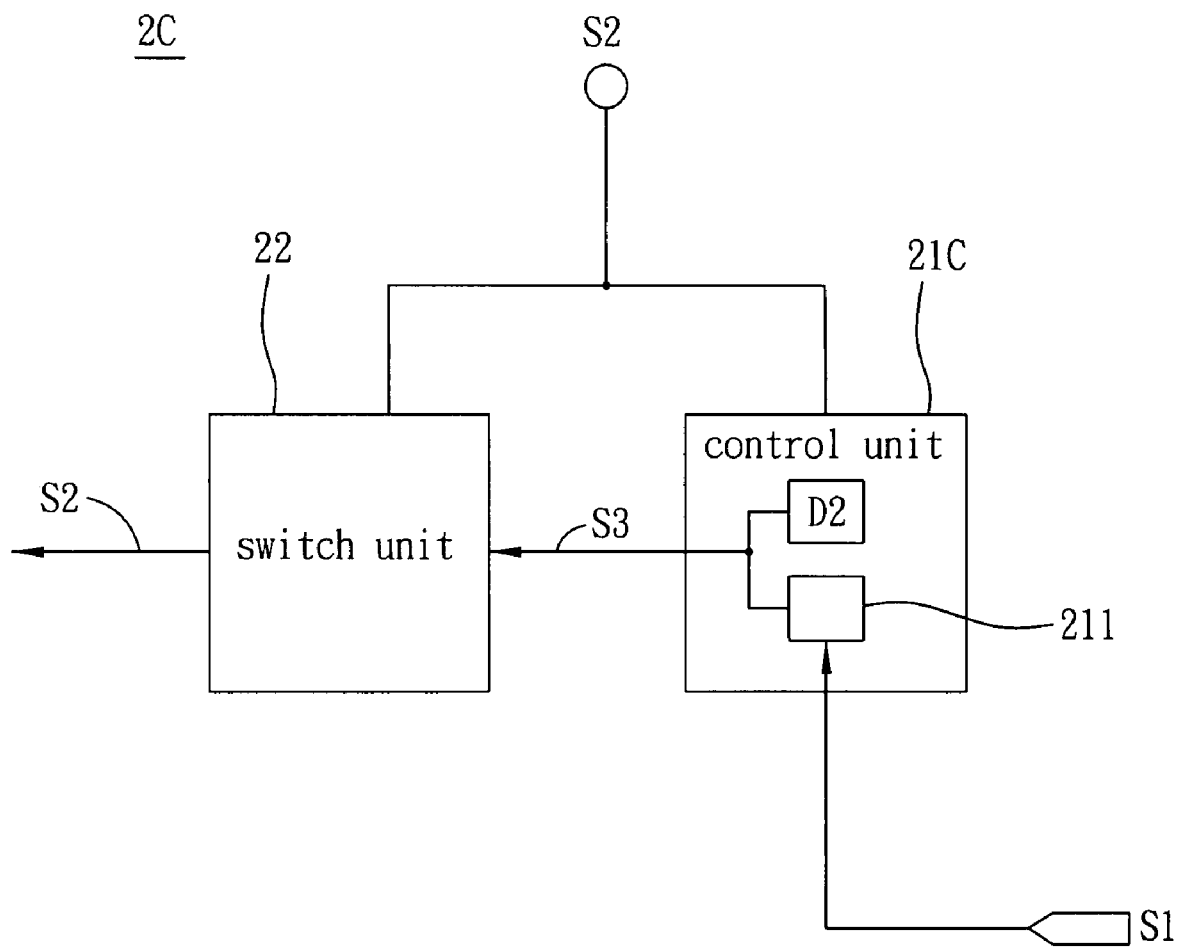
FIG. 6 is a schematic illustration showing the switch control device according to the embodiment of the invention, wherein the control unit is a processor.
Figure 7:
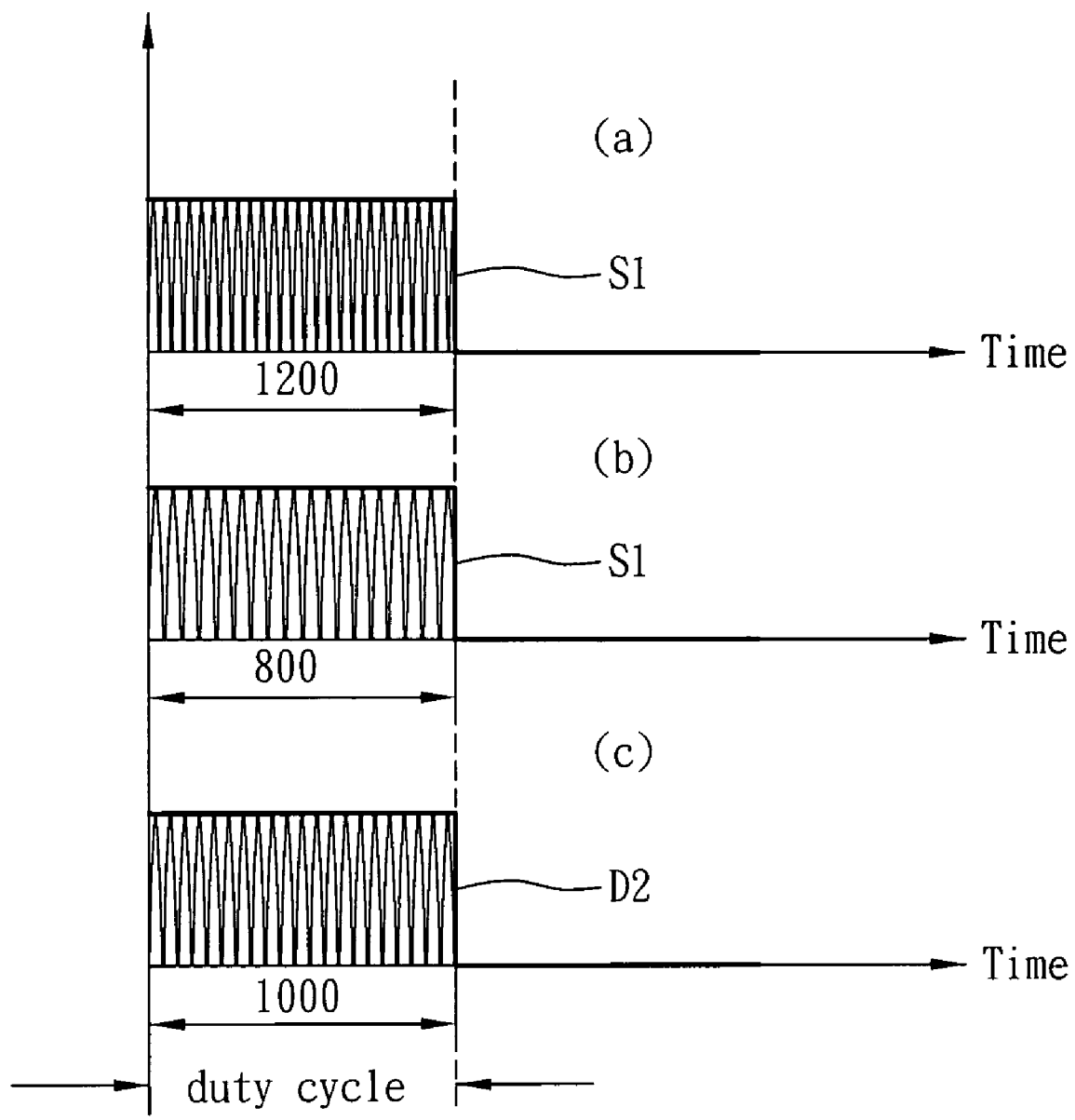
FIG. 7 is a schematic illustration showing the comparison of the number of pulses of the input signal and the number of turn-on pulses of the predetermined value during a turn-on cycle in the switch control device according to the embodiment of the invention.

FIG. 6 shows a switch control device 2C according to the embodiment of the invention. In the present invention, when the control unit is a processor, the processor has a counting element 211, as a control unit 21C shown in FIG. 6. At this time, the value of the input signal S1 serves as a count value, and the counting element 211 counts the number of turn-on pulses of the input signal S1, as shown in FIG. 7. When the input signal S1 is the number of turn-on pulses, the predetermined value D2 is a number of pulses, as shown in (c) of FIG. 7.

As shown in FIGS. 2, and 4 to 6, the switch unit 22 of this embodiment is electrically connected with the control unit 21, receives the control signal S3 and stops outputting the power signal S2 according to the control signal S3. The switch unit 22 of this embodiment can be implemented by, without limitation to, a second transistor Q2 shown in FIGS. 4 or 5. The second transistor Q2 has a gate for receiving the control signal S3, a source for receiving the power signal S2, and a drain electrically connected with a driving device (not shown). The second transistor Q2 can be implemented by, without limitation to, a PMOS transistor.

The switch control device 2 of this embodiment operates as follows. When the control unit 21A is the control circuit shown in FIG. 4. When the control circuit is in a normal state, the input signal S1 is received and biased by the first resistor R1 and the second resistor R2, and then the current of the input signal S1 is limited by the third resistor R3 and then transferred to the first transistor Q1. At this time, as the comparison between (a) and (c) shown in FIG. 3, the duty cycle (e.g., 60%) of the input signal S1 is greater than the duty cycle (e.g., 50%) of the predetermined value D2, and the turn-on time of the first transistor Q1 is longer than the turn-off time. Thus, the first capacitor C1 is continuously discharged through the fifth resistor R5 and the first transistor Q1 for a longer period of time. At this time, the control signal S3 is a low potential signal and outputted to the switch unit 22. Compared (b) and (c) of FIG. 3, if the duty cycle (e.g., 10%) of the input signal S1 is shorter than the duty cycle (e.g., 50%) of the predetermined value D2, the turn-on time of the first transistor Q1 will be far shorter than the turn-off time, and the power signal S2 enables the first capacitor C1 to be charged through the fourth resistor R4 and the fifth resistor R5 for a longer period of time. At this time, the control signal S3 is a high potential signal and is outputted to the switch unit 22.

When the control unit 21 is the control circuit shown in FIG. 5, the first input terminal I1 of the operational amplifier OP receives the power signal S2 after passing through the eighth resistor R8 and the ninth resistor R9 to generate a voltage value of a voltage drop serving as the predetermined value D2, the second input terminal I2 of the operational amplifier OP receives the input signal S1 after passing through the sixth resistor R6 and the seventh resistor R7 to generate a voltage drop, and the operational amplifier OP compares the inputs at the first and second input terminals. In a normal state, a voltage level of the input signal S1 (PWM signal) is higher than that of the predetermined value D2 for a longer period of time. Therefore, the output terminal O controls the second capacitor C2 to discharge through the eleventh resistor R11 for a longer period of time, and the control signal S3 is a low potential signal outputted to the switch unit 22. On the contrary, when the operational amplifier OP determines that the voltage level of the input signal S1 (PWM signal) is lower than that of the predetermined value D2 for the longer period of time by way of comparison, the output terminal O controls the second capacitor C2 to receive the power signal S2 from the tenth resistor R10 and to be charged by the power signal S2 for the longer period of time. At this time, the control signal S3 is a high potential signal outputted to the switch unit 22.

As shown in FIG. 6, when the control unit 21C is a processor, the counting element 211 of the processor counts the number of turn-on pulses of the input signal S1 in the duty cycle. In the normal state, assuming that the number of turn-on pulses of the input signal S1 is 1200 ((a) in FIG. 7) and that of pulses of the predetermined value D2 is 1000 ((c) in FIG. 7), the number of turn-on pulses of the input signal S1 will be greater than that of pulses of the predetermined value D2 so that the control unit 21C outputs the control signal S3, which is a low potential signal, to the switch unit 22. Assuming that the number of turn-on pulses of the input signal S1 is 800 ((b) in FIG. 7), which is smaller than the number of pulses of the predetermined value D2, the control unit 21C will output the control signal S3, which is a high potential signal.

In the normal state, the switch unit 22 shown in FIGS. 2 and 4 to 6 turns on so that the power signal S2 is outputted through the switch unit 22 when the control signal S3 received by the switch unit 22 is the low potential signal. When the control signal S3 is the high potential signal, the switch unit 22 turns off and immediately stops outputting the power signal S2. When the duty cycle of the input signal S1 is longer than that of the predetermined value D2 for the longer period of time (see FIG. 3), the voltage level of the input signal S1 is higher than that of the predetermined value D2 for the longer period of time, or the number of turn-on pulses (see FIG. 7) of the input signal S1 in the duty cycle is greater than that of pulses of the predetermined value D2, the control signal S3 becomes a low potential signal outputted to the switch unit 22 so that the switch unit 22 outputs the power signal S2 again.

The switch control device 2 can direct compare the input signal S1 with the predetermined value D2 through the control unit 21 or count the input signal S1 using the counting element 211 and then compare the count value with the predetermined value D2. In addition, when the duty cycle of the input signal S1 is shorter than that of the predetermined value D2 for the longer period of time, the voltage level of the input signal S1 is smaller than that of the predetermined value D2 for the longer period of time, or the number of turn-on pulses of the input signal S1 is smaller than the number of pulses of the predetermined value D2, using the above-mentioned comparison procedure enables the control unit 21 to generate and output the control signal S3. Thus, the switch unit 22 receives the control signal S3 and stops outputting the power signal S2 according to the control signal S3. According to this method in the period when the fan is powered off, the switch control device 2 can prevent the power signal S2 from being transferred to a post-stage circuit.

In the above-mentioned embodiments, the value of the input signal S1 and the predetermined value D2 are compared with each other in a non-limitative manner. According to the actual requirement, it is possible to stop outputting the power signal S2 when the value of the input signal S1 is either higher or lower than the predetermined value D2.

Figure 8:
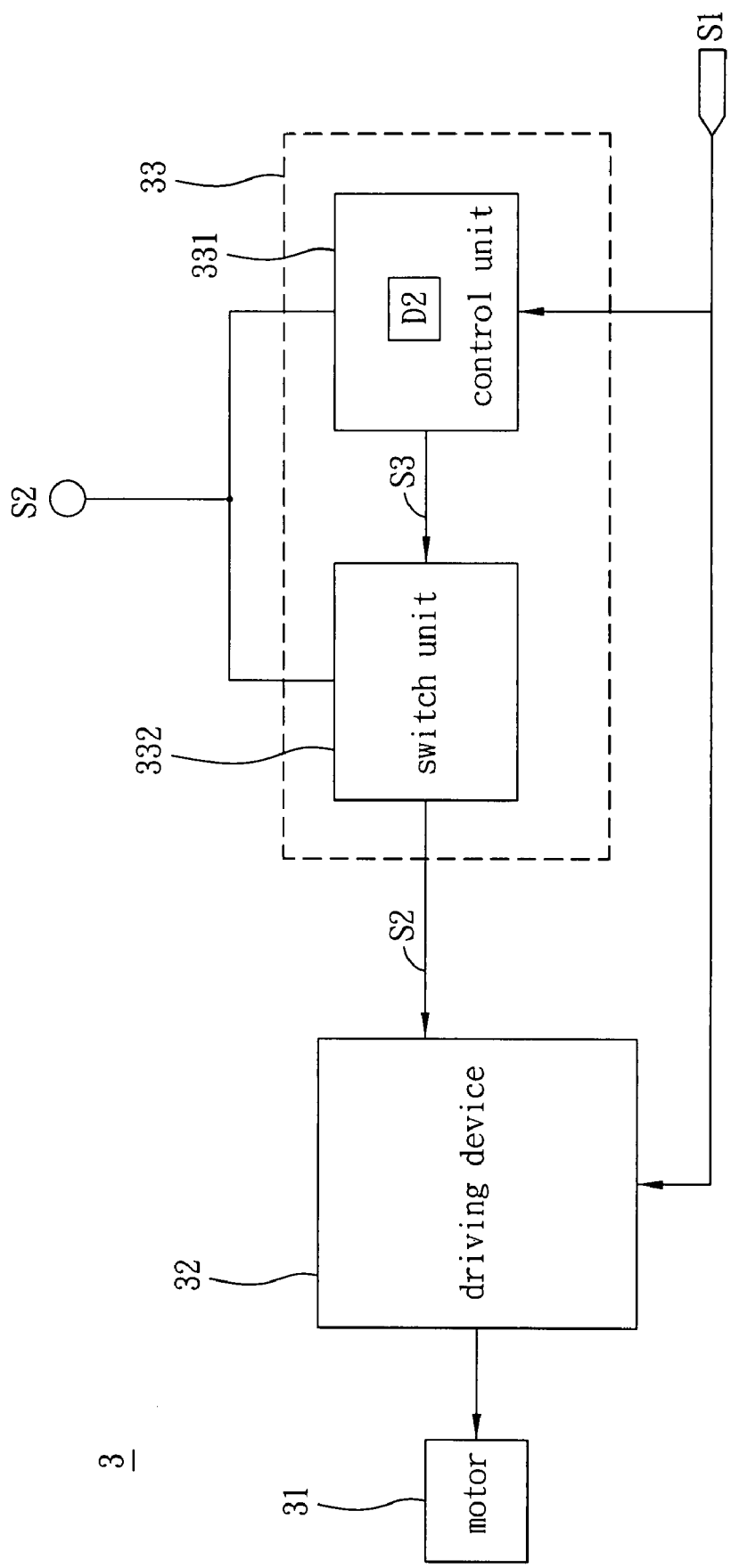
FIG. 8 is a schematic illustration showing a fan according to the embodiment of the invention.

Referring to FIG. 8, a fan 3 according to the embodiment of the invention receives an external input signal S1 and a power signal S2, and includes a motor 31, a driving device 32 and a switch control device 33. In other words, the motor 31, the driving device 32, and the switch control device 33 are built in the fan 3. In this embodiment, the driving device 32 is electrically connected with the motor 31 and the switch control device 33, receives the input signal S1 and the power signal S2, and drives the motor 31 according to the input signal S1 and the power signal S2.

The switch control device 33 has a control unit 331 and a switch unit 332, wherein the structures, operations and functions of the control unit 331 and the switch unit 332 are the same as those of the control unit 21 and the switch unit 22 (see FIG. 2) of the above-mentioned embodiment, so detailed descriptions thereof will be omitted. The control unit 331 of this embodiment can be a control circuit, as shown in FIGS. 4 or 5, or a processor, as shown in FIG. 6.

The fan 3 of this embodiment operates as follows. In the normal state, the driving device 32 receives the power signal S2 and drives the motor 31 to rotate. For example, when the duty cycle of the input signal S1 is shorter than that of the predetermined value D2 for the longer period of time, the switch control device 33 stops outputting the power signal S2 so that the driving device 32 cannot receive the power signal S2 and thus stops driving the motor 31 to rotate. The switch control device 33 outputs the power signal S2 again to enable the driving device 32 to drive the motor 31 to rotate according to the power signal S2 until the input signal S1 is higher than the predetermined value D2 for the longer period of time.

In addition to the method of judging the duty cycle, the voltage level or the number of turn-on pulses, it is to be specified that whether the power signal S2 is to be transferred to the driving device 32 can be determined according to the following method. In fact, the control unit 331 can also receive an input signal, such as a PWM signal, from the driving device 32, and the control unit 331 can count the number of turn-on cycles of the input signal in a period of time. The counted number can be compared with a predetermined value, which is also the number of turn-on cycles, in the processor. When the counted number is smaller than the predetermined value, the control unit 331 can enable the switch unit 332 to turn off to stop providing the power signal S2 to the driving device 32.

In summary, the fan and the switch control device thereof according to the invention directly compare the value of the input signal with the predetermined value, or compare the number of turn-on pulses or the number of turn-on cycles of the input signal, which is counted using the counting element, with the predetermined value. When the value of the input signal is lower than the predetermined value, the above-mentioned method enables the switch control device to judge whether to stop outputting the power signal to the driving device in order to stop driving the motor. Compared with the prior art, the fan of the invention compares the value of the input signal with the predetermined value through the switch control device, and can immediately stop providing the power to the fan when the fan is powered off so as to prevent the fan and its peripheral circuits and elements form consuming the power. In addition, the invention is composed of the circuits with the extremely low power consumption, so the consumed current of the overall circuits can be effectively lowered and controlled. Thus, the green environmental protection and the power-saving effect can further be achieved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A switch control device for receiving an input signal and a power signal, the switch control device comprising:
   a control unit having a predetermined value, receiving the input signal and the power signal, and outputting a control signal when a value of the input signal is unequal to the predetermined value; and
   a switch unit electrically connected with the control unit for receiving the control signal to stop outputting the power signal.

2. The switch control device according to claim 1, wherein the predetermined value is a minimum value of a rotating speed of a fan during an operation of the fan.

3. The switch control device according to claim 1, wherein the value of the input signal is a pulse width modulation (PWM) signal value or a count value.

4. The switch control device according to claim 1, wherein the control unit comprises:
   a first resistor having a first terminal for receiving the power signal, and a second terminal for receiving the input signal;
   a second resistor having a first terminal electrically connected with the second terminal of the first resistor, and a second terminal grounded;
   a third resistor having a first terminal for receiving the input signal;
   a fourth resistor having a first terminal for receiving the power signal and electrically connected with the first terminal of the first resistor;
   a first transistor having a gate electrically connected with a second terminal of the third resistor, a drain electrically connected with a second terminal of the fourth resistor, and a source grounded;
   a fifth resistor having a first terminal electrically connected with the second terminal of the fourth resistor and the drain of the first transistor; and
   a first capacitor having a first terminal electrically connected with a second terminal of the fifth resistor, and a second terminal grounded.

5. The switch control device according to claim 4, wherein the first transistor is an NMOS transistor.

6. The switch control device according to claim 1, wherein the control unit comprises:

a sixth resistor having a first terminal for receiving the power signal, and a second terminal for receiving the input signal;
   a seventh resistor having a first terminal electrically connected with the second terminal of the sixth resistor, and a second terminal grounded;
   an eighth resistor having a first terminal for receiving the power signal;
   an operational amplifier having a first input terminal electrically connected with a second terminal of the eighth resistor, and a second input terminal for receiving the input signal;
   a ninth resistor halting a first terminal electrically connected with the first input terminal of the operational amplifier, and a second terminal grounded;
   a tenth resistor having a first terminal for receiving the power signal;
   an eleventh resistor having a first terminal electrically connected with an output terminal of the operational amplifier, and a second terminal electrically connected with a second terminal of the tenth resistor; and
   a second capacitor having a first terminal electrically connected with the second terminal of the eleventh resistor, and a second terminal grounded.

7. The switch control device according to claim 1, wherein the control unit is a processor having a counting element for counting a number of turn-on cycles or a number of turn-on pulses of the input signal.

8. The switch control device according to claim 7, wherein the predetermined value is the number of cycles when counting the number of turn-on cycles of the input signal, or the predetermined value is the number of pulses when counting the number of turn-on pulses of the input signal.

9. The switch control device according to claim 1, wherein the switch unit comprises a second transistor having a gate for receiving the control signal, a source for receiving the power signal, and a drain electrically connected with a driving device.

10. The switch control device according to claim 9, wherein the second transistor is a PMOS transistor.

11. A fan, which receives an input signal and a power signal, comprising:
    a motor;
    a driving device electrically connected with the motor for receiving the power signal to drive the motor; and
    a switch control device electrically connected with the driving device and comprising a control unit and a switch unit, wherein the control unit has a predetermined value, receives the input signal and the power signal, and outputs a control signal when a value of the input signal is unequal to the predetermined value, and the switch unit is electrically connected with the control unit and receives the control signal to stop outputting the power signal, wherein the motor, the driving device, and the switch control device are built in the fan.

12. The fan according to claim 11, wherein the predetermined value is a minimum value of a rotating speed of the fan during an operation of the fan.

13. The fan according to claim 11, wherein the value of the input signal is a pulse width modulation (PWM) signal value or a count value.

14. The fan according to claim 11, wherein the control unit comprises:
    a first resistor having a first terminal for receiving the power signal, and a second terminal for receiving the input signal;

a second resistor having a first terminal electrically connected with the second terminal of the first resistor, and a second terminal grounded;

a third resistor having a first terminal for receiving the input signal;

a fourth resistor having a first terminal receiving the power signal and electrically connected with the first terminal of the first resistor;

a first transistor having a gate electrically connected with a second terminal of the third resistor, a drain electrically connected with a second terminal of the fourth resistor, and a source grounded;

a fifth resistor having a first terminal electrically connected with the second terminal of the fourth resistor and the drain of the first transistor; and a first capacitor having a first terminal electrically connected with a second terminal of the fifth resistor, and a second terminal grounded.

15. The fan according to claim 14, wherein the control unit comprises:

a sixth resistor having a first terminal for receiving the power signal, and a second terminal for receiving the input signal;

a seventh resistor having a first terminal electrically connected with the second terminal of the sixth resistor, and a second terminal grounded;

an eighth resistor having a first terminal for receiving the power signal;

an operational amplifier having a first input terminal electrically connected with a second terminal of the eighth resistor, and a second input terminal for receiving the input signal;

a ninth resistor having a first terminal electrically connected with the first input terminal of the OP amplifier, and a second terminal grounded;

a tenth resistor having a first terminal for receiving the power signal;

an eleventh resistor having a first terminal electrically connected with an output terminal of the OP amplifier, and a second terminal electrically connected with a second terminal of the tenth resistor; and a second capacitor having a first terminal electrically connected with the second terminal of the eleventh resistor, and a second terminal grounded.

16. The fan according to claim 11, wherein the control unit is a processor having has a counting element for counting a number of turn-on cycles or a number of turn-on pulses of the input signal.

17. The fan according to claim 16, wherein the predetermined value is the number of cycles when counting the number of turn-on cycles of the input signal, or the predetermined value is the number of pulses when counting the number of turn-on pulses of the input signal.

18. The fan according to claim 11, wherein the switch unit comprises a second transistor having a gate for receiving the control signal, a source for receiving the power signal, and a drain electrically connected with a driving device.

19. The fan according to claim 18, wherein the second transistor is a PMOS transistor.

20. The fan according to claim 11, wherein the input signal is outputted through the driving device.

* * * * *